United States Patent [19]

Kato et al.

[11] 4,420,592

[45] Dec. 13, 1983

[54] PROCESS FOR MULTI-STEP GASEOUS PHASE POLYMERIZATION OF OLEFINS

[75] Inventors: Akifumi Kato, Ohtake; Junichi Yoshida, Iwakuni; Ryoichi Yamamoto, Waki, all of Japan

[73] Assignee: Mitsui Petrochemical Industries Ltd., Tokyo, Japan

[21] Appl. No.: 309,588

[22] Filed: Oct. 8, 1981

[30] Foreign Application Priority Data

Oct. 9, 1980 [JP] Japan .................................. 55-140531

[51] Int. Cl.$^3$ ................................................ C08F 2/34
[52] U.S. Cl. ........................................ 526/65; 526/66; 526/78
[58] Field of Search ..................... 526/65, 66, 78, 87, 526/352, 352.2; 525/323

[56] References Cited

U.S. PATENT DOCUMENTS 3,971,768  7/1976  Peters ................................... 526/352
4,014,859  3/1977  Cooper ................................... 526/65

Primary Examiner—Paul R. Michl
Attorney, Agent, or Firm—Sherman & Shalloway

[57] ABSTRACT

A process for polymerizing an olefin in the gaseous phase in a multiplicity of steps in at least two independent polymerization zones connected to each other by a transfer passage, which comprises feeding an olefin and a catalyst into a first polymerization zone, polymerizing the olefin in the gaseous phase, intermittently or continuously withdrawing a gaseous stream containing the resulting polymer from the first zone and feeding it into said transfer passage, introducing the withdrawn polymer-containing gaseous stream into a second polymerization zone through the transfer passage, feeding the or an olefin into the second zone with or without feeding an additional supply of the catalyst thereinto, and polymerizing the olefin in the gaseous phase in the second zone; characterized in that an inert gas zone is provided in the transfer passage, and at least a part of the gas components of the gaseous stream containing the polymer is replaced by an inert gas.

2 Claims, 1 Drawing Figure

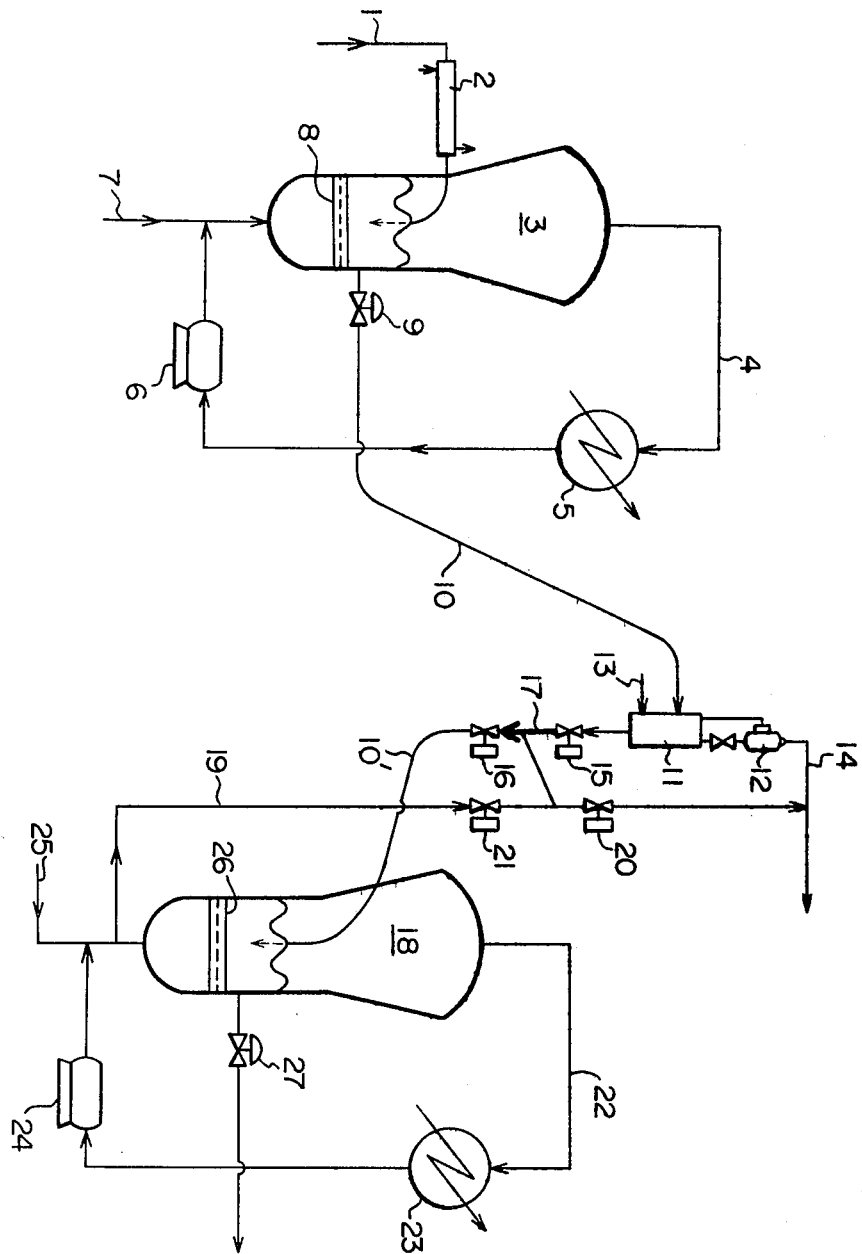

PROCESS FOR MULTI-STEP GASEOUS PHASE POLYMERIZATION OF OLEFINS

This invention relates to a process for polymerizing an olefin in the gaseous phase in a multiplicity of steps which can bring about various advantages. The process has the advantage that the polymerization conditions in the second step can be selected as desired without any restriction being imposed by the polymerization conditions of the first step, the operating conditions in the multistep gaseous phase polymerization of olefins and the properties of the resulting olefin polymer can be controlled to desired ranges, and furthermore, polymerization in a transfer passage can be reduced or prevented to remove such troubles as deposition of the polymer onto the wall of passage or the blocking of the passage.

In the present specification and the appended claims, the term "polymerization" denotes both homopolymerization and copolymerization, and the term "polymer" denotes both a homopolymer and a copolymer, unless they are distinguished expressly.

More specifically, this invention pertains to a process for polymerizing an olefin in the gaseous phase in a multiplicity of steps in at least two independent polymerization zones connected to each other by a transfer passage, which comprises feeding an olefin and a catalyst into a first polymerization zone, polymerizing the olefin in the gaseous phase, intermittently or continuously withdrawing a gaseous stream containing the resulting polymer from the first zone and feeding it into said transfer passage, introducing the withdrawn polymer-containing gaseous stream into a second polymerization zone through the transfer passage, feeding the olefin or an olefin into the second zone with or without feeding an additional supply of the catalyst thereinto, and polymerizing the olefin in the gaseous phase in the second zone; characterized in that an inert gas zone is provided in the transfer passage, and at least a part of the gas components of the gaseous stream containing the polymer is replaced by an inert gas.

At the current level of technology, the improvement of a transition metal catalyst component for olefin polymerization makes it possible to produce at least about 5,000 g of an olefin polymer per millimole of the transition metal, and an operation of removing the catalyst after the polymerization can be omitted. A process for polymerizing an olefin in the gaseous phase using such a highly active catalyst is attracting attention because the operation required after the polymerization is very simple.

On the other hand, olefin polymers are molded by various molding methods, and offered for use in various applications. It is important therefore to vary the molecular weight distribution and at times, the composition distribution of the olefin polymers according to such molding methods or end uses. The molecular weight distribution can be adjusted by varying the type, composition and amount of the polymerization catalyst, or the polymerization conditions. When the polymerization is carried out only in one polymerization zone, the extent of adjusting the molecular weight distribution is limited. It is preferred therefore to employ a multi-step polymerization process which comprises producing polymers having different distributions of molecular weight and/or composition in a first and a second zone which are independent from each other, introducing the reaction product of the first zone into the second zone, and performing the polymerization in the second zone in the presence of the reaction product of the first zone, thereby adjusting the molecular weight distribution and/or the composition distribution of the final polymerization product (for example, Japanese Laid-Open Patent Publication No. 145589/76 corresponding to U.S. Pat. No. 4,048,412).

Generally, hydrogen is preferred as a molecular weight controlling agent in order to obtain an olefin polymer of the desired molecular weight. It has been found that when the aforesaid multistep polymerization is carried out in the gaseous phase, particularly in the presence of hydrogen, a new technical problem different from those encountered in solution polymerization or suspension polymerization arises.

For example, in a process for polymerizing an olefin in the gaseous phase in a multiplicity of steps in the presence of a highly active catalyst, in which the polymer-containing gaseous stream formed in a first polymerization zone is transferred to a second polymerization zone and a polymer having a different molecular weight from the polymer formed in the first zone is produced in the second zone in the presence of the polymer formed in the first zone, it is advantageous, because of the general tendency of the highly active catalyst to exhibit especially high activity in the early stage of polymerization, to make a procedure of first forming a polymer having a low molecular weight in the presence of the catalyst in a step in which the amount of hydrogen is large, the partial pressure of the olefin is low and consequently the rate of polymerization is relatively low, and then forming a polymer having a higher molecular weight at a relatively high rate of polymerization, if the individual steps are operated at substantially the same polymerization pressure. This polymerization procedure, however, has the defect that since the polymer-containing gaseous stream discharged from the first polymerization zone contains the olefin and a larger amount of hydrogen than is required in the next polymerization zone, a large amount of the olefin must be additionally supplied to the second polymerization zone in order to decrease the proportion of hydrogen relative to the olefin and produce a polymer of a higher molecular weight in the second zone. In order to supply such a large amount of the olefin to the second zone, it is necessary to resort to measures which are disadvantageous to operation and equipment, for example to excessively increase the scale of the second polymerization zone, or to maintain the pressure of the second polymerization zone higher than that of the first polymerization zone.

The present inventors made investigations in order to provide a process for polymerizing an olefin in the gaseous phase in a multiplicity of steps which can remove the aforesaid technical defects of the multi-step gaseous phase polymerization process which comprises polymerizing an olefin in the gaseous phase in at least two independent gaseous phase polymerization zones connected to each other by a transfer passage wherein the polymer-containing gaseous stream formed in a first polymerization zone is introduced into a second polymerization zone and performing the second-step polymerization in the presence of the polymer formed in the first step, and performing gaseous phase polymerization of olefin successively in a plurality of polymerization zones.

These investigations have led to the discovery that the aforesaid technical defects can be removed by providing an inert gas zone in the transfer passage for transferring the polymer-containing gaseous stream from the first polymerization zone to the second polymerization zone and substituting an inert gas for at least a part of the gaseous stream containing the polymer.

The investigations of the present inventors show that by substituting an inert gas for at least a part of the polymer-containing gaseous stream in the transfer passage it is possible to select desired polymerization conditions for the second polymerization zone without any restriction being imposed by the polymerization conditions of the first zone. It has also been found that since this operation serves to reduce or prevent polymerization which may occur in the transfer passage between the first and second polymerization zones, it also brings about an advantage of eliminating the deposition of a polymer onto the wall of the transfer passage or the blocking of the transfer passage.

By dint of this simple procedure of substituting an inert gas, no trouble occurs, for example, in the operation of forming in the first polymerization zone an olefin polymer having a higher melt index than the olefin polymer formed in the second polymerization zone by maintaining the partial pressure of hydrogen in the first zone higher than that of the second zone. Or conversely, no trouble occurs in the operation of forming in the first zone an olefin polymer having a lower melt index than the olefin polymer formed in the first zone by maintaining the partial pressure of hydrogen in the first zone lower than that of the second zone. Consequently, the operating conditions in the multi-step gaseous phase polymerization olefins and the properties of the resulting olefin polymer can be controlled to desired ranges. Thus, all restrictions imposed on the conventional multi-step gaseous phase polymerization of olefins can be removed.

It is an object of this invention therefore to provide an improved process for polymerizing an olefin in the gaseous phase in a multiplicity of steps, which can eliminate the various defects of conventional processes for multi-step gaseous phase polymerization of olefins.

The above and other objects and advantages of this invention will become apparent from the following description.

According to the process of this invention, an olefin is polymerized in the gaseous phase in a multiplicity of steps in at least two independent polymerization zones connected to each other by a transfer passage. The olefin and a catalyst are fed into a first polymerization zone and the olefin is polymerized in the gaseous phase. A gaseous stream containing the polymer formed in the first zone is withdrawn intermittently or continuously from the first zone and introduced into the transfer passage. The withdrawn polymer-containing gaseous stream is then introduced into a second polymerization zone through the transfer passage, and the olefin is fed into the second zone with or without feeding an additional supply of the catalyst thereinto. The olefin is then polymerized in the gaseous phase in the second zone. By providing additional olefin polymerization zones before the first zone and/or after the second zone, the polymerization can be performed in more than three gaseous-phase polymerization zones. The process of this invention is applicable also to these additional polymerization steps.

In the practice of the multi-step polymerization by the process of this invention, an inert gas zone is provided in the aforesaid transfer zone, and at least a part of the gas components of the polymer-containing gaseous stream from the first zone is replaced by an inert gas.

In the process of the invention, the polymer formed in the first zone is carried together with the gas components of the first gaseous phase polymerization zone and withdrawn as a polymer-containing gaseous stream, and the gas components in the gaseous stream are partly replaced by an inert gas.

The inert gas denotes a gas which is non-polymerizable and does not adversely affect the activity of the catalyst used. Preferably, it is easily separable from the olefins used in the first and second polymerization zones by distillation, etc. Furthermore, the inert gas should not be liquefied during transfer to the second polymerization zone or in the second polymerization zone. Examples of the inert gas which meets these requirements include nitrogen and saturated hydrocarbons having 1 to 5 carbon atoms, such as methane, ethane, propane, n-butane, iso-butane, n-pentane and iso-pentane. Saturated hydrocarbons having 2 to 5 carbon atoms are preferred, and those having 3 or 4 carbon atoms are especially preferred. Advantageously, these saturated hydrocarbons have different numbers of carbons from the olefins polymerized in the first and second polymerization zones.

Substitution of the inert gas in the inert gas zone can be effected, for example, by the following methods.

While the inert gas is passed upwardly from the bottom of the inert gas zone having a cyclone provided at its top portion, a valve between the inert gas zone and the first polymerization zone is opened to supply a certain fixed amount of the polymer-containing gaseous stream into the inert gas zone, and thereafter, the valve is closed. The gases which have been transferred together with the polymer are carried by the inert gas and discharged out of the system through the cyclone. As a result, the gas components in the inert zone gas are replaced by the inert gas. A zone for collecting the polymer is provided downstream of the inert gas zone and upstream of the second polymerization zone, and the polymer from the inert gas zone is collected there. Communication between the inert gas zone and the polymer collecting zone is shut off, and again a fixed amount of the polymer-containing gaseous stream from the first polymerization zone is taken into the inert gas zone. The above cycle is then repeated.

When the polymer-containing gaseous stream from the first polymerization zone is to be continuously withdrawn, the same procedure as above can be performed except that when the amount of the polymer in the inert gas zone reaches a fixed amount, it is transferred to the polymer collecting zone.

In the case of the continuous withdrawal of the polymer-containing gaseous stream, it is also possible to continuously withdraw the polymer from the polymerization zone by means of, for example, a high-pressure rotary valve and continuously contacting it countercurrently with the inert gas in the transfer passage having a suitable length.

It is not necessary to perform substitution of the inert gas completely. But in order to prevent polymerization until the polymer-containing gaseous stream is fed into the second polymerization zone, the substitution is preferably effected to the greatest possible extent. For example, it is preferably performed until the proportion of the inert gas reaches at least about 80% by volume, preferably at least about 90% by volume, especially preferably at least about 95% by volume, based on the total volume of the gases in the inert gas zone.

The gases discharged through the cyclone may be re-used after separating them into the individual components by cooling condensation, distillation, and the like.

The polymer taken into the polymer collecting zone is fed into the second polymerization zone where the gaseous phase polymerization of olefin is continued.

According to this process, the polymer can be retained in the inert gas zone shut off from the polymerization zones while it is being transferred from the first polymerization zone to the second polymerization zone, and moreover, the gas components of the first polymerization zone are replaced partly by the inert gas, the polymerization conditions for the second polymerization zone can be independently selected as desired without being dominated by the polymerization pressure or the gas composition of the first polymerization zone.

In introducing the polymer retained in the inert gas zone after substitution of the inert gas into the second polymerization zone, it is preferred to collect the polymer from the inert gas zone into the collecting zone, shut off the communication between the inert gas zone and the polymer collecting zone, and transfer the collected polymer to the second polymerization zone.

One embodiment of the process of this invention is illustrated more specifically with reference to the accompanying drawing (FIG. 1).

FIG. 1 is a flow sheet showing one embodiment of the process of this invention. A catalyst suspension prepared in a separate vessel by subjecting a transition metal compound and an organometallic compound to prepolymerization treatment with a small amount of an olefin in an easily volatile liquid medium such as a saturated hydrocarbon having 3 to 5 carbon atoms is fed from a line 1, and after the liquid medium is vaporized by a heater 2, is supplied to a first polymerization vessel 3. The polymerization vessel 3 in this embodiment is a fluidized bed reactor, which is so designed that gases discharged from its top through a line 4 are recycled to the polymerization vessel 3 after going through a condenser 5 and a circulating blower 6. The recycle gases and starting gases from a line 7, for example at least one olefin and optionally hydrogen, come into the polymerization vessel 3 from its bottom, and pass through a porous plate 8 to float and fluidize the polymer and catalyst and induce polymerization of the olefin.

A polymer discharge valve 9 is opened or closed intermittently in order to maintain the height of the fluidized bed of the polymerization vessel 3 substantially constant, or discharges the resulting polymer while being opened with a fixed degree of opening in order to withdraw it continuously. An inert gas is caused to flow from the bottom of a container 11 (inert gas zone) equipped with a cyclone 12 at its top portion through a line 13. Downstream of the container 11 and between switch valves 15 and 16 is provided a small chamber 17 (polymer collecting zone) for temporarily storing a polymer. The small chamber 17 constitutes means for collecting the polymer carried together with the inert gas and transferring the collected polymer to a second polymerization zone 18 while shutting off the communication between the small chamber 17 and the container 11.

A line 19 connecting a gas exhausting line 14 of the container 11 to a gas feeding portion of the second polymerization vessel 18 has switch valves 20 to 21 provided therein. The part between the switch valves 20 and 21 is connected to the small chamber 17 for free gas flowing.

In the case of withdrawing the polymer-containing gaseous stream formed in the first polymerization vessel intermittently, the discharge valve 9 of the polymerization vessel 3 is opened when the switch valve 15 is in the closed state. When a certain fixed amount of the polymer is fed to the container 11 through a transfer passage 10, the discharge valve 9 is closed. The gases in the polymer-containing gas transferred to the container 11 are at least partly replaced by an inert gas by the introduction of the inert gas from the line 13. The gases discharged from the container 11 are sent to a recovery unit through a line 14. The polymer maintained in an atmosphere of the inert gas is transferred to the small chamber 17 by gravity by closing the switch valves 16 and 21 and opening the switch valves 15 and 20. Then, the switch valves 15 and 20 are closed and the switch valves 16 and 21 are opened, whereupon the polymer is sent under pressure into the second polymerization vessel 18 through a line 10'. By adjusting the opening and closing cycles of the discharge valve 9 and the switch valves 15, 16, 20 and 21 by means of a timer or the like, the transfer of the polymer from the first polymerization vessel 3 to the second polymerization vessel 18 can be performed easily and automatically.

In the case of continuously withdrawing the polymer-containing gaseous stream, the polymer is continuously fed into the container 11 through the transfer passage 10 while maintaining the switch valve 15 closed and the discharge valve 9 opened. Every time the amount of the polymer in the container 11 reaches a fixed amount, the switch valve 15 is opened to transfer a part or the whole of the polymer into the small chamber 17. Otherwise, the same operation as in the case of the intermittent withdrawal may be carried out to transfer the polymer from the first polymerization vessel 3 to the second polymerization vessel 18.

Thus, according to one preferred embodiment of the present invention, the polymer is withdrawn from the inert gas zone made of the container 11 having the cyclone 12, and introduced into the second polymerization zone through the means for shutting off the communication with the inert gas zone and transferring the collected polymer to the second polymerization zone. The introduction can be effected by utilizing the recycle gas in the second polymerization zone.

The polymerization in the second polymerization vessel 18 can be carried out in the same way as the polymerization in the first polymerization vessel. Specifically, the polymerization can be carried out using the recycle gas circulating through the condenser 23 and the circulating blower 24 and at least one olefin fed through a line 25 and optionally, hydrogen while fluidizing the polymer containing the catalyst through the porous plate 26. The resulting polymer is discharged from a discharge valve 27 so that the height of the fluidized layer becomes substantially constant, and sent to a recovery unit.

Although, the process of this invention has been described hereinabove with reference to one preferred embodiment, it should be understood that various changes and modifications are possible within the scope of the invention as defined in the appended claims.

Thus, according to this invention, a polymer composition having desired constituent proportions can be obtained continuously and stably by gaseous phase polymerization which is industrially advantageous.

The process of this invention can be conveniently utilized for the polymerization of an olefin in the presence of a transition metal catalyst, especially a highly active transition metal catalyst component and an organometallic compound of a metal of Groups I to III of the periodic table. The process of the invention is especially preferably applied to the polymerization of olefins in the presence of a highly active catalyst capable of affording at least about 5,000 g, especially at least about 8,000 g, of an olefin polymer per millimole of the transition metal.

The transition metal catalyst component (T) which can be used in the practice of the process of this invention may be a compound of a transition metal such as titanium, vanadium, chromium and zirconium which may be liquid or solid under conditions of use. It needs not to be a single compound, and may be supported on, or mixed with, another compound. It may also be a complex compound with another compound. A highly active transition metal catalyst component capable of producing at least about 5,000 g, especially at least about 8,000 g, of an olefin polymer per millimole of the transition metal is a suitable example of the transition metal catalyst component (T). A typical example is a highly active titanium catalyst component activated with a magnesium compound. For example, there can be preferably used a solid titanium catalyst component consisting essentially of titanium, magnesium and halogen, which contains an amorphous magnesium halide and has a specific surface area of preferably at least about 40 m$^2$/g, especially preferably about 80 to about 800 m$^2$/g.

The titanium catalyst component may further include an electron donor such as organic acid esters, silicic acid esters, acid halides, acid anhydrides, ketones, acid amides, tertiary amines, inorganic acid esters, phosphoric acid esters, phosphorous acid esters, and ethers.

Such a titanium catalyst component preferably contains about 0.5 to about 15% by weight, especially about 1 to about 8% by weight, of titanium, and in which the titanium/magnesium atomic ratio is from about ½ to about 1/100, especially from about ⅓ to about 1/50, the halogen/titanium atomic ratio is from about 4 to about 100, especially from about 6 to about 80, and the electron donor/titanium mole ratio of from 0 to about 10, especially from 0 to about 6.

Various proposals have already been made about these catalyst components, and they are well known in the art.

The organometallic compound, the other component of the catalyst, is an organometallic compound of a metal of Groups I to III of the periodic table which has a metal-carbon bond. Examples of the organometallic compound are organometallic compounds of alkali metals, organometallic compounds of alkaline earth metals, and organoaluminum compounds. Specific examples include alkyllithiums, arylsodiums, alkylmagnesiums, arylmagnesiums, alkylmagnesium halides, arylmagnesium halides, alkylmagnesium hydrides, trialkyl aluminums, dialkylaluminum monohalides, alkylaluminum sesquihalides, alkylaluminum dihalides, alkylaluminum hydrides, alkylaluminum alkoxides, alkyllithium aluminums, and mixtures of these.

In order to control stereospecificity, molecular weight, molecular weight distribution, etc., an electron donor catalyst component may be used in addition to the above two catalyst components. Examples of the electron donor are organic acid esters, silicic acid esters, carboxylic acid halides, carboxylic acid amides, tertiary amines, acid anhydrides, ethers, ketones, aldehydes and halogenated hydrocarbons. The electrodonor component may be used as a complex compound (or adduct) with the organometallic compound in the polymerization. Or it may be used in the form of a complex (or adduct) with another compound such as a Lewis acid (e.g., aluminum trihalides).

Examples of olefins which are used in the polymerization process of this invention include ethylene, propylene, 1-butene, 1-pentene, 1-hexene, 1-octene, 1-decene, 4-methyl-1-pentene, 3-methyl-1-pentene, styrene, butadiene, isoprene, 1,4-hexadiene, dicyclopentadiene, and 5-ethylidene-2-norbornene. At least one of them may be selected so as to permit gaseous phase polymerization, and homopolymerization or copolymerization of the olefin or olefins is carried out.

The polymerization conditions in the first polymerization zone and the polymerization conditions in the second polymerization zone can be independently selected without any restriction because of the inert gas zone provided in the transfer passage. It is not necessary to produce a polymer of the same composition in the first and second polymerization zones. The process of this invention is preferably applied to the homopolymerization of ethylene or propylene, the copolymerization of ethylene with another olefin, and the copolymerization of propylene with another olefin. According to an especially preferred embodiment, the process of the invention is applied to the homopolymerization or copolymerization of ethylene in which the adjustment of the molecular weight distribution is required. The process of this invention is especially advantageously used in a polymerization procedure in which hydrogen is used in the first polymerization zone and the amount of hydrogen in the second polymerization zone, as expressed by the hydrogen/olefin mole ratio, is lower than the hydrogen/olefin mole ratio in the first polymerization zone.

The gaseous phase polymerization in each step can be performed by using a fluidized bed reactor, stirred bed reactor, a stirred and fluidized bed reactor, a tubular reactor, etc. The reaction temperature in each of the polymerization zones is below the melting point of the olefin polymer, preferably below a point at least about 10° C. lower than the melting point, more preferably from room temperature to about 130° C., especially from about 40° C. to about 110° C. The polymerization pressure is from atmospheric pressure to about 150 kg/cm$^2$, especially from about 2 to about 70 kg/cm$^2$.

As stated above, a molecular weight controlling agent, such as hydrogen, may be caused to be present during the polymerization. The amount of hydrogen used is, for example, not more than about 20 moles per mole of the olefin. The reaction temperature and pressure may differ between the two polymerization zones. As regards the polymerization pressure, the transfer of the polymer is advantageous when the pressure of the second polymerization zone is lower. However, no appreciable difficulty arises even when the pressure of the second zone is higher than the pressure of the first zone.

When the aforesaid transition metal catalyst component, and the organometallic compound and if desired, the electron donor catalyst component are used, it is preferred to use about 0.005 to about 1 millimole, especially about 0.001 to about 0.5 millimole, of the transition metal atom per liter of the reaction bed, and the organometallic compound in such a proportion that the atomic ratio of the metal of the organometallic compound to the transition metal is about 1 to about 2000, especially about 1 to about 500. Preferably, the electron donor catalyst component is used in a proportion of 0 to about 1 mole, especially 0 to about 0.5 mole, per mole of the organometallic compound.

What we claim is:

1. In a process for polymerizing an olefin in the gaseous phase in a multiplicity of steps in at least two independent polymerization zones connected to each other by a transfer passage, which comprises feeding an olefin and a catalyst into a first polymerization zone, polymerizing the olefin in the gaseous phase, intermittently or continuously withdrawing a gaseous stream containing the resulting polymer from the first zone and feeding it into said transfer passage, introducing the withdrawn polymer-containing gaseous stream into a second polymerization zone through the transfer passage, feeding the olefin or an olefin into the second zone with or without feeding an additional supply of the catalyst thereinto, and polymerizing the olefin in the gaseous phase in the second zone; the improvement wherein an inert gas zone is provided in the transfer passage, and at least a part of the gas components of the gaseous stream containing the polymer is replaced by an inert gas selected from the group consisting of saturated hydrocarbons having 1 to 5 carbon atoms and nitrogen.

2. The process of claim 1 wherein the inert gas is a saturated hydrocarbon having 2 to 5 carbon atoms whose number of carbon atoms differs from that of the olefin to be polymerized.

* * * * *